S. A. SCOTT.
BALL COCK.
APPLICATION FILED JULY 30, 1912.

1,097,476.

Patented May 19, 1914.

Witnesses:

Inventor
Stewart A. Scott

UNITED STATES PATENT OFFICE.

STEWART ALLISON SCOTT, OF DUNEDIN, NEW ZEALAND.

BALL-COCK.

1,097,476.

Specification of Letters Patent. Patented May 19, 1914.

Application filed July 30, 1912. Serial No. 712,328.

*To all whom it may concern:*

Be it known that I, STEWART ALLISON SCOTT, building contractor, a subject of His Majesty the King of Great Britain, residing at 49 Reid road, in the city of Dunedin, in the British Dominion of New Zealand, have invented certain new and useful Improvements in Ball-Cocks, and do hereby declare that the following is a full, clear, and exact description of the invention, such as will enable others skilled in the art to which it appertains to make and use the same.

The object of this invention is to produce a self filling cock of the class actuated by a float, that in rising with the incoming water, allows the valve to be closed by the said water and in falling with the out-going water presses the said valve from its seating and between guides which prevent it from vibrating consequent upon the rush of water.

Figure 1:
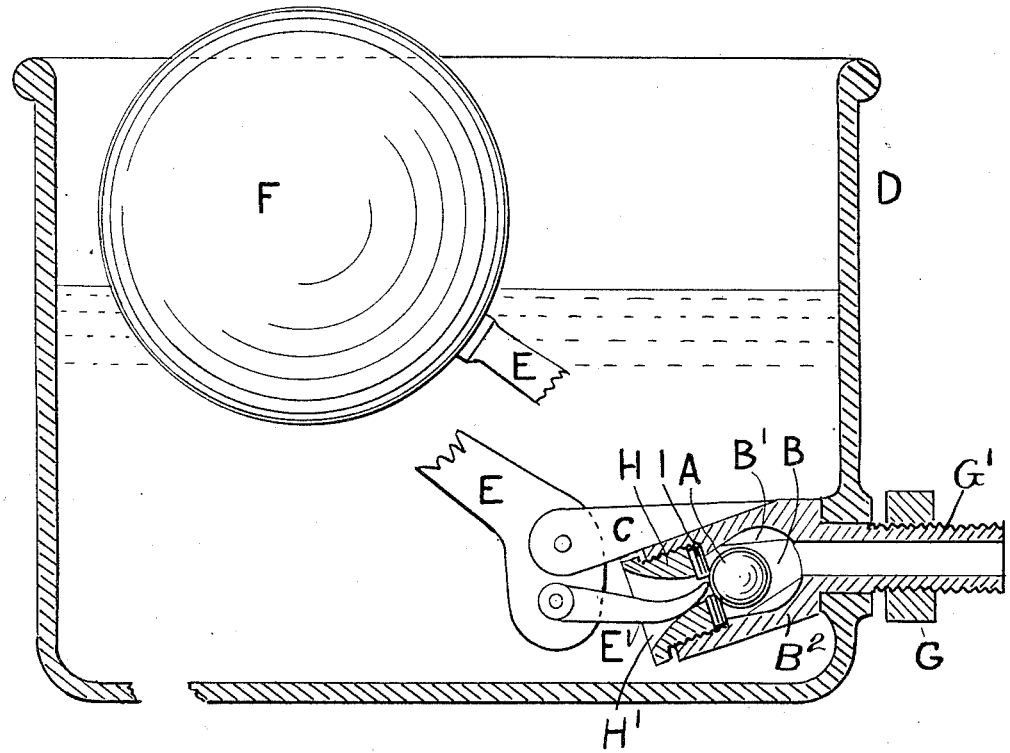
Figure 2:
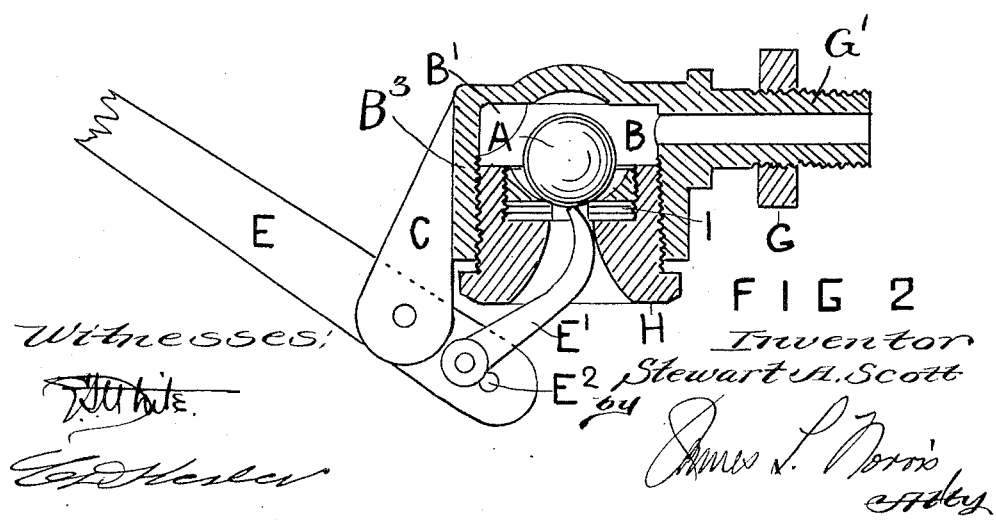

Referring to the accompanying drawing:—Figure 1 is a longitudinal section of the tank to be kept full, and the cock being in section also. Fig. 2 is a section of a similar cock but turned more down.

The tank D, which may be of any dimensions, has an inlet pipe G' externally screw-threaded and provided with a backing nut G. This pipe extends through the wall of the tank and terminates in an enlarged downwardly inclined chambered head $B^2$, the chamber being indicated by the reference character B and having a plurality of guides B' in the wall thereof. The said guides converge toward the inlet pipe G' and extend to the point where the bore of said pipe opens into the said chamber. The wall of the chamber B slightly converges in the opposite direction toward a yielding or soft seat I having an opening therethrough and held in place by a gland H, and within the chamber a ball valve A of suitable hard substance, such as metal or glass, is mounted, said valve when in engagement with the opening of the seat I. serving to shut off the inlet of water to the tank. The gland H is formed with an outwardly flared opening H' through which projects the reduced upwardly curved end of a lever E' connected to the main lever E, the latter having a float F attached thereto. The lever E is fulcrumed upon a bracket C carried by the head $B^2$. The guides B' extend substantially the entire length of chamber B, as shown, and by their converged or tapered construction, operate to prevent vibration of the ball valve A during its full movement when pushed away from its seat by the lever E', and these guides are rigid and insure a positive action of the said valve. It will be observed that the lever E', in releasing the valve from its seat, operates with a prizing action, owing to the position of the said lever and the shape of the end thereof which engages the valve. This lever action requires far less power than the straight out-push and as there is considerable resistance against displacement of the valve by the pressure of water thereon through the inlet, the unseating of the valve may be more readily accomplished by the particular arrangement of the lever E' as explained as well as by its shape.

In Fig. 2 the construction is practically the same as that shown in Fig. 1, except that the head $B^3$ is at a greater angle or at a right angle to the inlet pipe G' and an adjusting means for the lever E' to accommodate varying pressures is shown at $E^2$, whereby the said lever E' may be varied as to its position relatively to the lever E, or the said lever E' may be shifted to different positions on the device for supporting the same and held by said lever E. This adjustable feature for the lever E' may also be in like manner applied to the construction shown in Fig. 1. The organization of parts shown in Fig. 2 is in other respects similar to that illustrated by Fig. 1.

What is claimed is:

The combination, with a tank; of a water inlet pipe mounted in one of the lower corners of said tank and having an enlarged, downwardly-opening, terminal head formed with a chamber into which the bore of said pipe opens; a gland fitted in the open end of said head and formed with an outwardly-flared opening, the inner end of which opening has a valve seat associated therewith; a ball valve movable within said chamber and normally held by the pressure of the incoming water in closed position against said seat; a float-lever fulcrumed upon said head; and a valve-operating lever pivoted to the lower end of said float-lever directly adjacent the fulcrum of the latter and having a reduced, upwardly-curved end which projects into said gland opening and normally rests directly against the adjacent wall of that opening and is supported thereby, the terminal of said operating lever extending into the opening in the valve seat in position to engage and unseat said valve when said float-lever is actuated.

In testimony whereof, I have hereunto set my hand in presence of two subscribing witnesses.

STEWART ALLISON SCOTT.

Witnesses:
  HENTON MACAULAY DAVEY,
  JOHN RICHARDSON.

Copies of this patent may be obtained for five cents each, by addressing the "Commissioner of Patents, Washington, D. C."